3,327,244
DC-DC CONVERTER INCLUDING A MULTIVIBRATOR OPERATIVE AT A DESIRED FREQUENCY
Charles W. Fay, Glenside, and Samuel Pure, Rydal, Pa., assignors to the United States of America as represented by the Secretary of the Navy
Filed Dec. 27, 1963, Ser. No. 334,057
10 Claims. (Cl. 331—113)

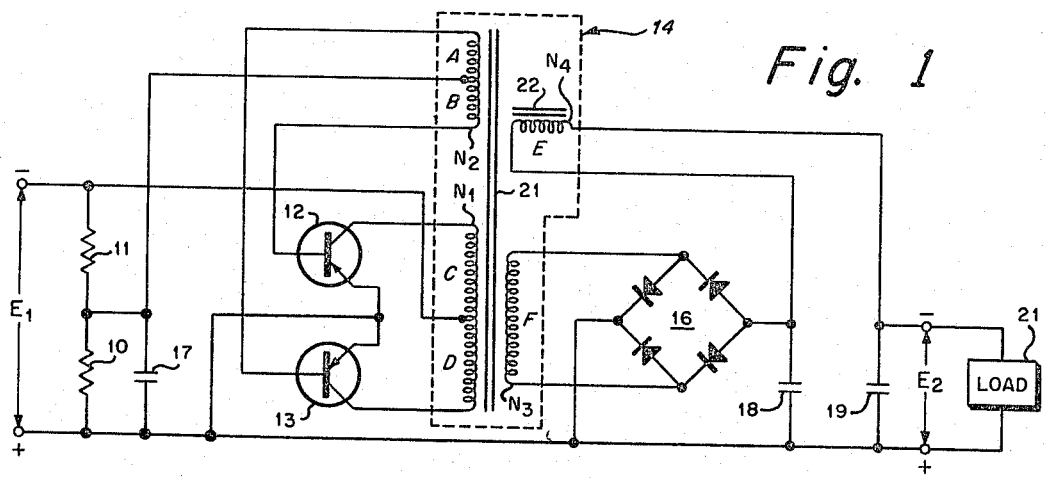
Fig. 1
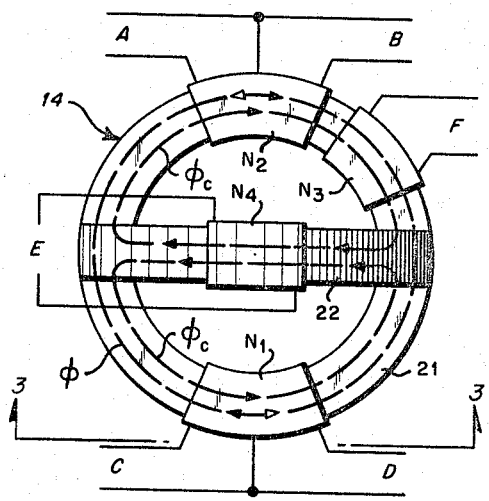
Fig. 2
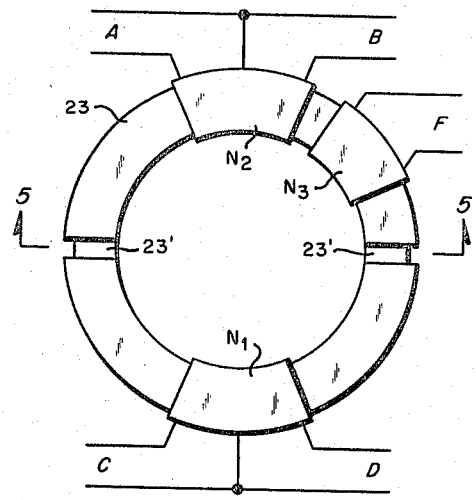
Fig. 4
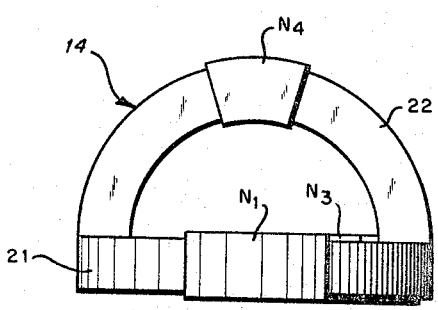
Fig. 3
Fig. 5
INVENTORS
CHARLES W. FAY
SAMUEL PURE
BY
ATTORNEY United States Patent Office 3,327,244
Patented June 20, 1967

The invention disclosed herein may be manufactured and used by or for the Government of the United States of America for governmental purposes without the payment of any royalties therein or therefor.

The present invention relates to a DC-to-DC converter employing a magnetic coupled transistor multivibrator, and more particularly to a DC-to-DC converter in which the multivibrator operates at a desired frequency.

In order to step-up or step-down a DC (direct current) voltage supply, it is common to convert the DC to an AC (alternating current) voltage, magnetically transform the AC voltage, and then rectify the transformer AC voltage back to a DC voltage. A magnetically coupled transistor multivibrator is used for converting and transforming. The oscillating frequency of the multivibrator is determined by the saturation time of the magnetic core and will depend, inter alia, on the composition of the core material, on the number of turns in the transformer primary and switching windings, and on the flux density. Unfortunately, short-time saturation core materials at high frequency operation are usually inefficient; and increasing the number of winding turns to shorten the saturation time is limited by space, weight, and the flux density for maximum efficiency. While a higher flux density produces rapid saturation of the core, heretofore known techniques for increasing the flux density have usually resulted in an overall power loss. It was not uncommon, therefore, to compromise between high frequency and maximum efficiency.

Accordingly, it is an object of the present invention to provide an improved DC-to-DC converter utilizing a magnetic coupled multivibrator which operates at relatively high frequency and high efficiency, in which the operating frequency can be controlled above a range which would otherwise produce conditions that interfere with other electronic circuit operation, in which magnetic shielding or other elaborate filtering devices are not required because of the absence of the normally encountered power supply interference, in which maximum miniaturization is made possible by the reduction in size and number of components required, and in which a wider selection of transformer core material is made possible for highest efficiency.

Another object of the invention is to provide an improved DC-to-DC converter having a magnetic coupled multivibrator in which a single electrical element serves both as a filter choke at the output thereof and as an oscillating frequency control for the multivibrator.

A further object of the invention is to provide a novel filter choke at the output of a DC-to-DC converter having a magnetic coupled multivibrator in which a portion of a transformer core in the converter is used in common as a portion of a filter choke core.

Still another object of the invention is to provide a novel transformer core for use in a magnetic coupled multivibrator whereby higher operating frequencies are obtained with only a slight decrease in efficiency.

A still further object of the invention is to provide an improved DC-to-DC converter which utilizes a magnetic coupled multivibrator which is especially suitable for use in sonobuoys which usually process sonar frequencies below 10 kc., which is simple in construction and reliable in operation, and which is inexpensive to manufacture, lightweight, compact and sturdy.

Various other objects and advantages will appear from the following description of several embodiments of the invention, and the most novel features will be particularly pointed out hereinafter in connection with the appended claims.

In the drawings:

FIG. 1 is a schematic wiring diagram of a DC-to-DC converter embodying the principle of the invention in one of its forms;

FIG. 2 represents a view of the transformer shown schematically in FIG. 1;

FIG. 3 represents another view of the transformer taken along the line 3—3 of FIG. 2;

FIG. 4 represents a view of a transformer as used in an alternative embodiment of the invention; and FIG. 5 represents a cross sectional view of the alternative transformer as taken along the line 5—5 of FIG. 4.

In one of the illustrated embodiments of the invention, FIG. 1 schematically illustrates a DC-to-DC converter comprising a magnetic coupled multivibrator. A DC voltage source $E_1$ is impressed across a voltage divider comprising serially connected resistors 10 and 11; the input terminal at the resistor 11 being identified by convention as negative (−) and resistor 10 as positive (+). A pair of transistors 12 and 13, connected in common emitter configuration, have their emitters connected to the positive input terminal. Their collectors are connected across the primary winding $N_1$ of a transformer indicated generally by the numeral 14. The winding $N_1$ is center-tapped and connected to the negative input terminal. A switching winding $N_2$ in the transformer 14 has its end terminals connected respectively to the bases of transistors 12 and 13 to provide a driving voltage induced from the primary winding $N_1$. The winding $N_2$ is also center-tapped and connected to the junction of resistors 10 and 11 for providing an appropriate DC bias voltage to the transistor bases. As thus far described, the circuit including the transistors 12 and 13 and the windings $N_1$ and $N_2$ constitute a "free-running" multivibrator; the oscillating frequency being uncontrolled.

The transformer 14 further comprises an output winding $N_3$ in which the induced AC voltage output is related to the applied AC voltage at the winding $N_1$ by a factor equal to the turns ratio between the windings $N_3$ and $N_1$. The AC voltage at the winding $N_3$ is then converted back to a DC voltage by a full wave rectifier indicated generally by the numeral 16. The positive output terminal from the rectifier 16 is connected to the positive input and output terminals of the converter thereby maintaining a fixed voltage reference such as ground potential.

The DC voltage output from the rectifier 16 requires smoothing and filtering of undesirable and spurious AC signals. This is accomplished by connecting a choke winding $N_4$ in the transformer 14 between the negative output from the rectifier 16 and the converter negative output terminal. A pair of capacitors 18 and 19 are respectively connected from opposite ends of the winding $N_4$ and the positive input terminal forming thereby a steady DC output voltage $E_2$. A load 21 is shown connected to the converter output terminals.

A description of the particular manner in which the several windings are magnetically coupled in transformer 14 is essential to an understanding and appreciation of the inventive concepts. As shown in FIG. 2, the windings $N_1$, $N_2$ and $N_3$ are formed about a core having a toroidal section 21 in the transformer 14. The winding $N_4$ is formed about a semicircular section 22 integrally connected at its ends to diametrically opposite sides of the toroidal section 21 and projecting from one side thereof in a plane normal to the planar surface of the toroidal section 21.

During one-half of the multivibrator oscillating cycle while transistor 12 is conducting, the primary winding $N_1$ produces a flux $\phi$ in the toroidal section 21 in a direction shown by the "black" arrows. When the section 21 becomes saturated at any point along the flux path, the switching winding $N_2$ causes the transistor 13 to become conducting instead of transistor 12 to produce a reversal in the flux $\phi$ in the direction shown by "white" arrows. It is postulated that a control flux $\phi_C$ is produced by the choke winding $N_4$ in one direction as shown by the arrows. Thus, it will be observed that while the transistor 12 is conducting, the fluxes $\phi$ and $\phi_C$ are additive along one-half of the toroidal section 21 thereby producing earlier core saturation than would otherwise be produced without the choke winding $N_4$. During the second half of the cycle, while transistor 13 is conducting, the fluxes $\phi$ and $\phi_C$ are additive in the other half of the toroidal core 21, and again the core saturation time is foreshortened. The overall effect is to shorten the entire oscillation cycle, hence increase the oscillating frequency. Of course it is understood that the invention is not limited to any particular configuration of transformer core. For example, instead of a section 21 and 22 being circular, they may be rectangular; and they may be laminated or made up of plural sections.

An alternative embodiment of the invention, shown in FIGS. 4 and 5, show a toroidal core 23 on which the windings $N_1$, $N_2$ and $N_3$ are wound in the manner described in connection with FIGS. 1 and 2. The core 23 defines two grooved sections 23' disposed on diametrically opposite sides of the core 23. These grooved sections 23' have the effect of increasing the flux density along the core for relatively short flux path distances while the flux density over the rest of the path remains relatively low. The effect is that core saturation occurs more quickly at the grooved sections 23' and the oscillating frequency of the multivibrator is thereby increased. The same effect could be accomplished by using a core of smaller cross-sectional area along the entire length of the flux path, however, the minimum area is limited by the amount of power to be transferred. Too small an area over the entire length would entail too great a power loss and efficiency would be considerably reduced. By having the reduced areas 23' limited to only a short distance of the total flux path, the power losses occur substantially at the reduced areas only instead of throughout the entire core.

Some of the many advantages of the present invention should now be apparent. For example, the DC-to-DC converter can be designed to operate at a frequency higher than its "free-running" oscillating frequency. For example, in sonobuoys, it is desired that any internal oscillating frequencies such as from a multivibrator be well above those encountered in sonar detection. This eliminates the need for magnetic shielding or other elaborate filtering devices otherwise required to prevent power supply interference in the sonobuoy. Each of the disclosed embodiments makes possible miniaturization and permits selection of transformer core materials for highest efficiency.

It will be understood, of course, that various changes in the details, materials, steps and arrangement of parts which have been herein described and illustrated in order to explain the nature of the invention may be made by those skilled in the art within the principle and scope of the invention as expressed in the appended claims.

What is claimed is:

1. A DC-to-DC converter comprising, in combination:
first and second input terminals;
a pair of transistors with their emitters being connected in common to said first input terminal;
a magnetic transformer including a core formed to provide a flux path therein, and primary, secondary and switching windings formed about said core;
electrical conduit means respectively connecting the collectors of said transistors to the end terminals of said primary winding;
electrical conduit means connecting a center tap of said primary winding to said second input terminal;
electrical conduit means respectively connecting the end terminals of said switching winding to the bases of said transistors;
voltage dividing means including a pair of serially connected resistors across said first and second input terminals;
electrical conduit means connecting a center tap of said switching winding to the junction of said resistors;
a filter choke;
a full wave rectifier having two inputs respectively connected to the end terminals of said secondary winding and two outputs connected respectively to said first input terminal and one end terminal of said filter choke;
first and second output terminals, said first output terminal being connected to the other end terminal of said filter choke, and said second output terminal being connected to said first input terminal;
a pair of capacitors respectively connected between the end terminals of said filter choke and said first input terminal; and
means operatively connected to said transformer core for maintaining the oscillating frequency at a substantially stable and relatively high rate.

2. A DC-to-DC converter comprising, in combination:
first and second input terminals;
a pair of transistors with their emitters being connected in common to said first input terminal;
a magnetic transformer including a core formed to provide a flux path therein, and primary, secondary and switching windings formed about said core;
electrical conduit means respectively connecting the collectors of said transistors to the end terminals of said primary winding, a center tap of said primary winding to said second input terminal, and the end terminals of said switching winding to the bases of said transistors;
a filter choke magnetically coupled to said transformer;
a full wave rectifier having two inputs respectively connected to the end terminals of said secondary winding and two outputs connected respectively to said first input terminal and one end terminal of said filter choke;
first and second output terminals, said first output terminal being connected to the other end terminal of said filter choke, and said second output terminal being connected to said first input terminal; and
means operatively connected to said transformer core for maintaining the oscillating frequency at a substantially stable and relatively high rate.

3. A DC-to-DC converter comprising, in combination:
first and second input terminals;
a pair of transistors with their emitters being connected in common to said first input terminal;
a magnetic transformer including a core formed to provide a flux path therein, primary, secondary and switching windings formed about said core;
a rectifier having two inputs respectively connected to the end terminals of said secondary winding and having two output terminals;
electrical conduit means respectively connecting the collectors of said transistors to the end terminals of said primary winding, a center tap of said primary winding to said second input terminal, and the end terminals of said switching winding to the bases of said transistors; and
said transformer including means for increasing flux density along a selected flux path portion of a length less than the entire length of said path.

4. A DC-to-DC converter comprising, in combination:
first and second input terminals;

a pair of transistors with their emitters being connected in common to said first input terminal;

a magnetic transformer including first and second core sections, said first core section being formed to provide a first flux path therein, primary, secondary and switching windings formed about said first core section, said second core section integrally connecting separated portions of said first core section and being formed therewith to provide a second flux path therein, and a choke winding formed about said second core section;

electrical conduit means respectively connecting the collectors of said transistors to the end terminals of said primary winding;

electrical conduit means connecting a center tap of said primary winding to said second input terminal;

electrical conduit means respectively connecting the end terminals of said switching winding to the bases of said transistors;

voltage dividing means including a pair of serially connected resistors across said first and second input terminals;

electrical conduit means connecting a center tap of said switching winding to the junction of said resistors;

a full wave rectifier having two inputs respectively connected to the end terminals of said secondary winding and two outputs respectively connected to said first input terminal and one end terminal of said choke winding;

first and second output terminals, said first output terminal being connected to the other end terminal of said choke winding, and said second output terminal being connected to said first input terminal; and a pair of capacitors respectively connected between the end terminals of said choke winding and said first input terminal;

whereby the oscillating frequency of the converter is maintained at a substantially stable and relatively high rate.

5. A DC-to-DC converter comprising, in combination:
first and second input terminals;

a pair of transistors with their emitters being connected in common to said first input terminal;

a magnetic transformer including first and second core sections, said first core section being formed to provide a first flux path therein, primary, secondary and switching windings formed about said first core section, said second core section integrally connecting separated portions of said first core section and being formed therewith to provide a second flux path therein, and a choke winding formed about said second core section;

electrical conduit means respectively connecting the collectors of said transistors to the end terminals of said primary winding, a center tap of said primary winding to said second input terminal, and the end terminals of said switching winding to the bases of said transistors;

a full wave rectifier means having its input connected to said secondary winding and its output connected to one end terminal of said choke winding; and first and second output terminals, said first output terminal being connected to the other end terminal of said choke winding, and said second output terminal being connected to said first input terminal;

whereby the oscillating frequency of the converter is maintained at a substantially stable and relatively high rate.

6. A DC-to-DC converter comprising, in combination:
first and second input terminals;

a pair of transistors with their emitters being connected in common to said first input terminal;

a magnetic transformer including first and second core sections, said first core section being formed to provide a first flux path therein, primary, secondary and switching windings formed about said first core section, said second core section integrally connecting separated portions of said first core section and being formed therewith to provide a second flux path therein and a choke winding formed about said second core section;

first and second output terminals connected to the end terminals of said secondary winding;

electrical conduit means respectively connecting the collectors of said transistors to the end terminals of said primary winding, a center tap of said primary winding to said second input terminal, and the end terminals of said switching winding to the bases of said transistors;

a full wave rectifier having two inputs respectively connected to said first and second output terminals of said secondary winding and two outputs respectively connected to said first input terminal and one end terminal of said choke winding;

whereby the oscillating frequency of the multivibrator is maintained at a substantially stable and relatively high rate.

7. A DC-to-DC converter comprising, in combination:
first and second input terminals;

a pair of transistors with their emitters being connected in common to said first input terminal;

a magnetic transformer including a core section being formed to provide a flux path therein, said core section having a plurality of reduced cross-sectional areas formed therein at separated portions along the flux path, and primary, secondary and switching windings formed about said core;

electrical conduit means respectively connecting the collectors of said transistors to the end terminals of said primary winding;

electrical conduit means connecting a center tap of said primary winding to said second input terminal;

electrical conduit means respectively connecting the end terminals of said switching winding to the bases of said transistors;

voltage dividing means including a pair of serially connected resistors across said first and second input terminals;

electrical conduit means connecting a center tap of said switching winding to the junction of said resistors;

a full wave rectifier having two inputs respectively connected to the end terminals of said secondary winding and two outputs, one of the outputs being connected to said first input terminal;

first and second output terminals, said second output terminal being connected to said first input terminal;

a filter choke electrically connected between the other output of said rectifier and said first output terminal; and a pair of capacitors respectively connected between the end terminals of said choke and said first input terminal;

whereby the oscillating frequency of the converter is maintained at a substantially stable and relatively high value.

8. A DC-to-DC converter comprising, in combination:
first and second input terminals;

a pair of transistors with their emitters being connected in common to said first input terminal;

a magnetic transformer including a core section being formed to provide a flux path therein, said core section having a plurality of reduced cross-sectional areas formed therein at separated portions along the flux path, and primary, secondary and switching windings formed about said core;

electrical conduit means respectively connecting the collectors of said transistors to the end terminals of said primary winding, a center tap of said primary winding to said second input terminal, and the end terminals of said switching winding to the bases of said transistors;

a full wave rectifier having two inputs respectively connected to the end terminals of said secondary winding and two outputs, one of the outputs being connected to said first input terminal;

first and second output terminals, said second output terminal being connected to said first input terminal; and a filter choke electrically connected between the other output of said rectifier and said first output terminal;

whereby the oscillating frequency of the converter is maintained at a substantially stable and relatively high value.

9. A DC-to-DC converter comprising, in combination:

first and second input terminals;

a pair of transistors with their emitters being connected in common to said first input terminal;

a magnetic transformer having a core section being formed to provide a flux path therein, said core section having a plurality of reduced cross-sectional areas formed therein at separated portions along the flux path, primary, secondary and switching windings formed about said core;

a rectifier having two inputs respectively connected to the end terminals of said secondary winding and having two output terminals;

electrical conduit means respectively connecting the collectors of said transistors to the end terminals of said primary winding, a center tap of said primary winding to said second input terminal, and the end terminals of said switching winding to the bases of said transistors;

whereby the oscillating frequency of the converter is maintained at a substantially stable and relatively high value.

10. A DC-to-DC converter comprising, in combination:

a magnetic coupled multivibrator adapted to receive a DC electrical input and an AC electrical output at the oscillating frequency thereof;

a full wave rectifier operatively connected to the multivibrator output;

a filter choke operatively connected to the rectifier output; and means for magnetically coupling said filter choke to said multivibrator for maintaining the oscillating frequency thereof.

References Cited

UNITED STATES PATENTS

| | | | |
|---|---|---|---|
| 1,821,016 | 9/1931 | Ka Dell | 321—10 |
| 3,010,074 | 11/1961 | Kiesling | 331—113.1 |
| 3,133,256 | 5/1964 | Denelsbeck et al. | 321—2 X |
| 3,192,464 | 6/1965 | Johnson et al. | 321—2 |
| 3,235,790 | 2/1966 | Collins | 321—2 X |
| 3,275,948 | 9/1966 | Rosenbusch | 331—181 X |

JOHN F. COUCH, *Primary Examiner.*

W. H. BEHA, *Assistant Examiner.*